A. N. ADAMS.
REVERSING GEARING.
APPLICATION FILED OCT. 21, 1913.

1,138,718.

Patented May 11, 1915.
2 SHEETS—SHEET 1.

WITNESSES:
Clarence M. Smith
J. B. Webster

INVENTOR.
A. N. Adams
BY
ATTORNEYS.

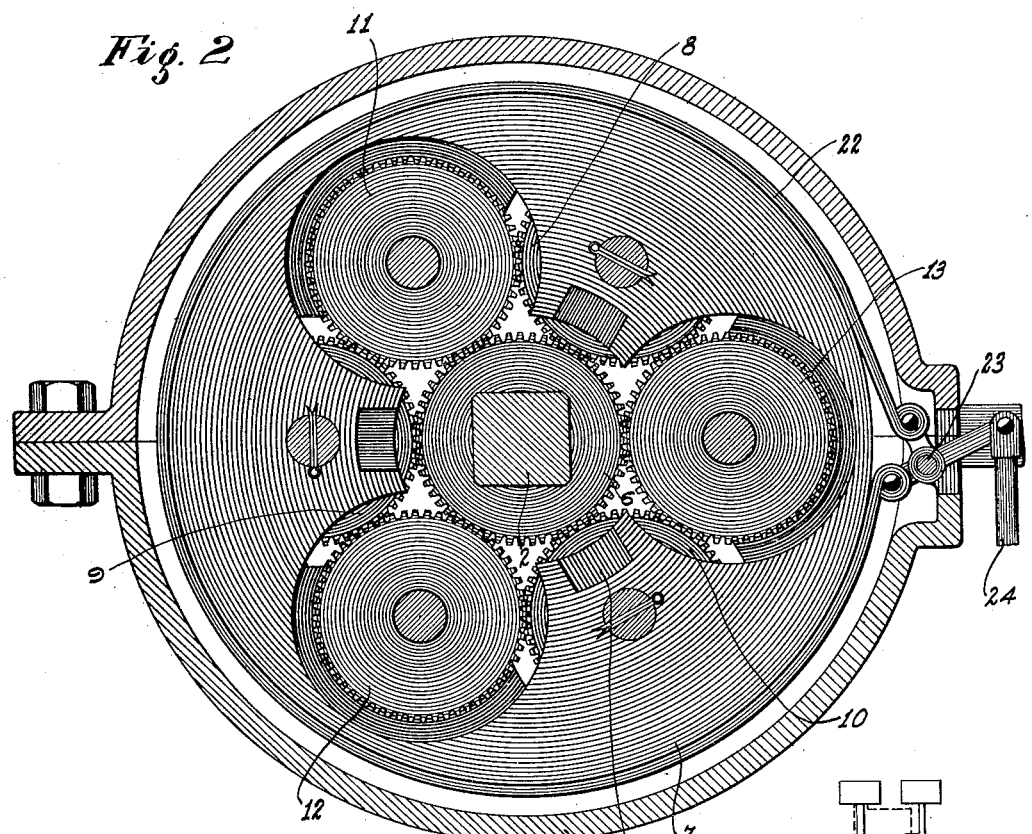
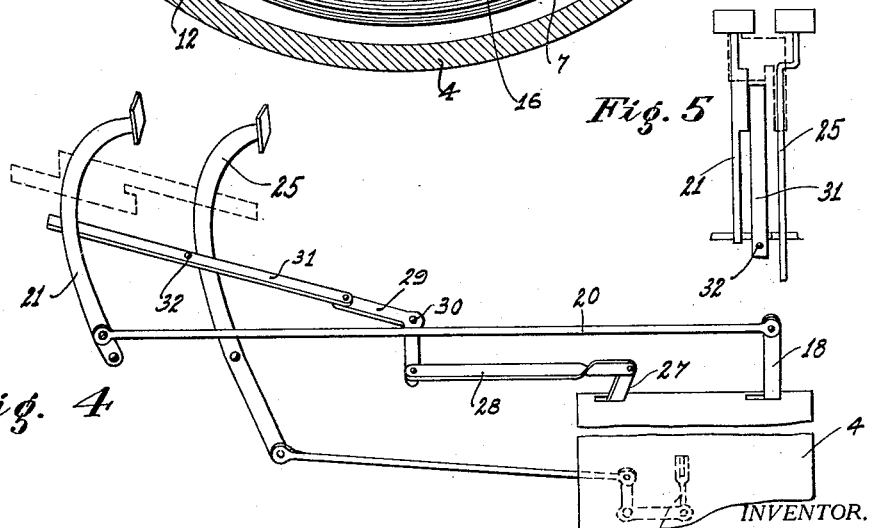
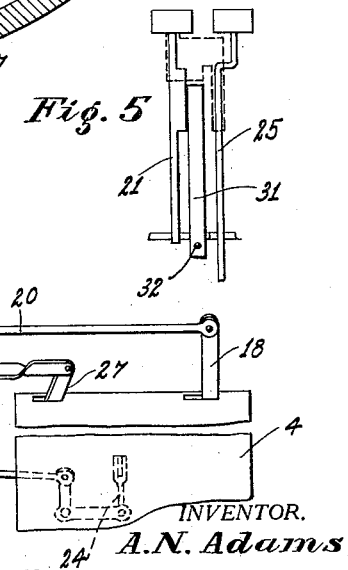

UNITED STATES PATENT OFFICE.

ALFRED N. ADAMS, OF STOCKTON, CALIFORNIA.

REVERSING-GEARING.

1,138,718. Specification of Letters Patent. Patented May 11, 1915.

Application filed October 21, 1913. Serial No. 796,439.

*To all whom it may concern:*

Be it known that I, ALFRED N. ADAMS, a citizen of the United States, residing at Stockton, in the county of San Joaquin, State of California, have invented certain new and useful Improvements in Reversing-Gearing; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in gearing used in connection with motor vehicles and is particularly designed as a reverse gear to be used more particularly in connection with the transmission gearing shown in my issued Patent No. 958,061 and dated May 17th, 1910, and in my pending application for patent Ser. No. 667,572 and filed December 26th, 1911, the object of the invention being to produce a reverse gearing which can be operated quickly and easily without the necessity of changing from one gear to another, but which can be accomplished merely by braking the movement of one of the parts.

A further object of the invention is to produce a means whereby said braking operation may be made by a friction engagement of the parts or by a direct rigid lock which will prevent any slipping of the parts when the reverse motion is had.

A still further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1:
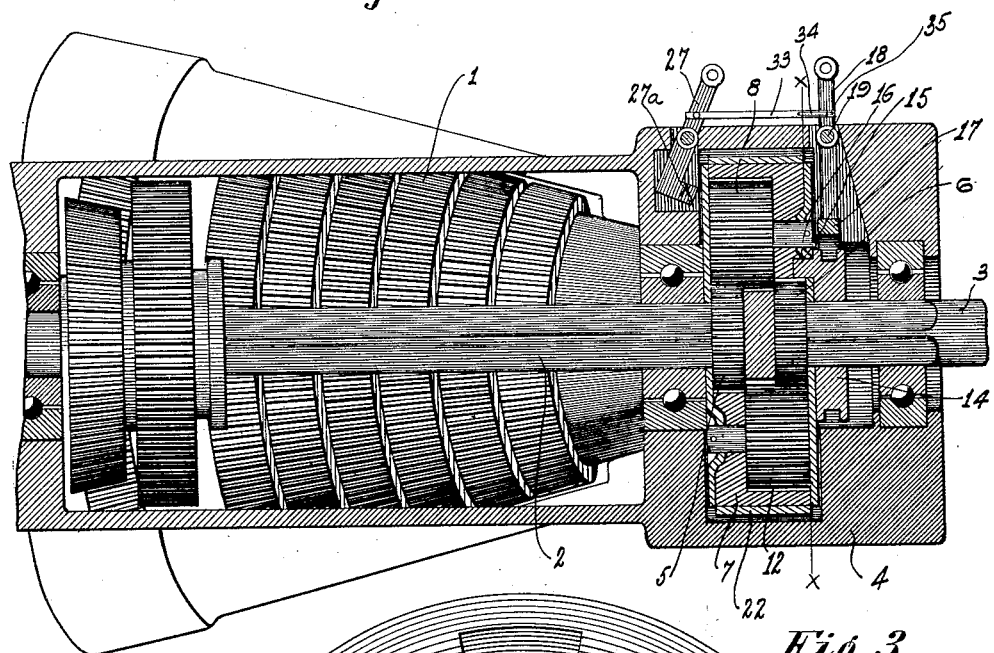
Figure 3:
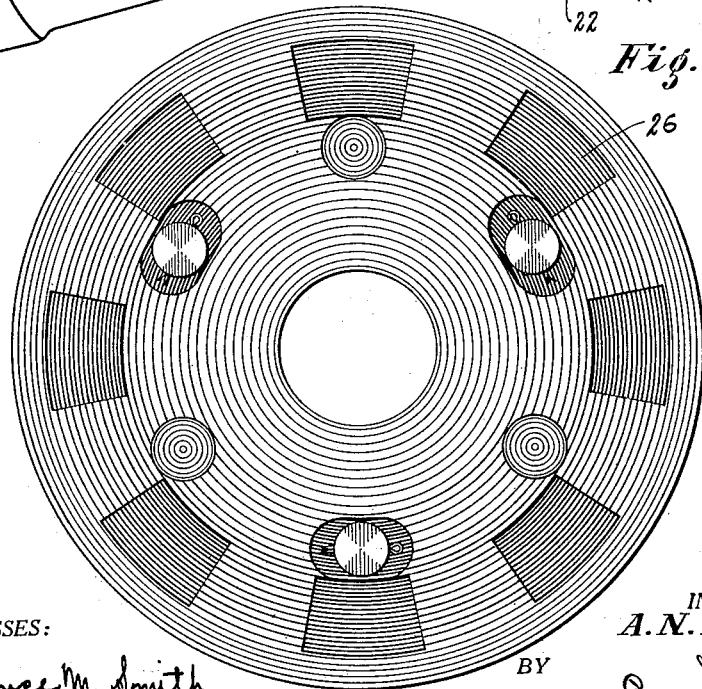

Figure 1 is a sectional view of my transmission gearing, showing the reverse mechanism connected therewith. Fig. 2 is a sectional view taken on a line X—X of Fig. 1. Fig. 3 is a side elevation of the reverse gearing case. Fig. 4 is a diagrammatic view of the operating levers for the gearing. Fig. 5 is a top plan view of the structure shown in Fig. 4.

Referring now more particularly to the characters of reference on the drawings, the numeral 1 designates the forward drive transmission gear and the numeral 2 the driving shaft thereof.

The numeral 3 designates the driven shaft and it is between the shafts 2 and 3 that I provide my reverse gearing which is constructed as follows, namely: The numeral 4 designates the casing within which the shafts 2 and 3 are journaled and on the end of the shaft 2 is a gear 5 and on the end of the shaft 3 is a gear 6.

The numeral 7 designates the casing for the reverse gearing and in this casing is journaled three gears 8, 9 and 10 engaging the gear 5. These three gears 8, 9 and 10 in turn engage three other gears 11, 12 and 13 on the other side of the casing 7, which last named gears engage the gear 6.

On the squared end of the shaft 3 is slidably mounted a yoke 14 provided with clutch dogs 15 adapted to engage recesses 16 in one face of the member 7 and when the forward motion of the shaft 3 is desired, these dogs 15 are engaged in said recesses 16 thus locking said member 7 to the shaft 3. Then when said member 7 is free to turn, the gears engaging as described, form a lock for each other within the member 7 and then with the forward drive of the shaft 2, such gears and the casing 7 and the shaft 3 turn as a unit giving the necessary forward drive to the shaft 3. Then when a reverse motion of the shaft 3 is desired, the same is accomplished by means of the following structure and operation, namely: The yoke 14 is provided with a shifting yoke 17 engaging the same, which yoke 17 is provided with an operating lever 18 suitably fulcrumed at 19 and connected by a link 20 by a foot operating pedal 21. By the operation of this pedal 21 the clutch members 15 are disengaged from the recesses 16 and then the movement of the member 7 is braked by means of the following structure, namely:

A friction brake band 22 encircles the member 7 and is provided with a toggle joint 23 at its free ends adapted to be operated by a rod 24 connected with a foot pedal 25. By the operation of this foot pedal 25, the brake band 22 is brought into frictional contact with the member 7 preventing its movement and also since said member 7 is disengaged from any connection with the shaft 3 in the manner set forth above, this causes the drive of the shaft 2 to turn all of the gears, as described, which will turn the shaft 3 in the reverse direction.

The above structure describes a frictional means for braking the movement of the member 7, but I also provide a rigid lock for the same which comprises a plurality of recesses 26 in the face of the member 7 opposite that face in which are the recesses 16, and I then provide a lever 27 provided on its lower end with an inwardly projecting dog 27ª adapted to engage one of said recesses 26 to lock the member 7 against operation which will absolutely preclude any slipping of the member 7 which might occur if the friction band 22 is used alone as the braking means for said member 7.

The lever 27 is operated by means of the foot lever 25 by reason of the following structure, namely: Connected with the lever 27 is a rod 28 connected with a bell crank 29 fulcrumed at 30 which in turn is connected with a lever 31 fulcrumed at 32. This lever 31 projects normally along side of the foot pedal 21 and cannot be operated until such foot pedal 21 is moved to such position as it assumes when it throws the clutch members 15 out of engagement with the recesses 16 and thus it will be seen that the member 7 cannot be rigidly locked until it is freed from any connection with the shaft 3 thus avoiding the breaking of parts. The lever 31 is operated after the friction member 22 has been brought into contact with the member 7 by throwing the foot pedal slightly sidewise causing it to engage the lever 31 and move it on its fulcrum point 32 which then pulls on the various parts 29, 28 and 27 to throw the dog 27ª into connection with one of the recesses 26 thus rigidly locking the member 27 against any movement and preventing any chance of its slipping through the friction band 22. As will be noted this rigid engagement is not made until after the band 22 has brought the member 7 to a stop so that there will be no sudden jerking of parts as the member 7 engages one of the recesses 26.

In order to prevent any possible chance of the dog 27ª engaging one of the recesses 26 before the clutch members 15 are disengaged from the recesses 16, I connect the member 27 with the member 28 by means of a rod 33 whereby when the member 27 is moved it will also move the member 18 causing it to disengage the members 15 from the recesses 16. The member 33 is slotted as at 34 where it connects with the pin 35 on the member 18 so that the member 18 can be moved independently of the member 27, if desired.

From the foregoing description it can readily be seen that I have produced a reverse gear by means of which the reverse action can be had quickly and easily without the changing of the transmission gearing and further one which can be turned into positive reverse without danger of slipping or breaking of parts.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention what I claim as new and useful and desire to secure by Letters Patent is:—

1. A device of the character described comprising the combination with a driving shaft and a driven shaft, of a casing provided with recesses, a train of gears journaled in said casing and interposed between said driving shaft and said driven shaft whereby, when said casing is held stationary, said driving shaft and said driven shaft will move in opposite directions, a friction band mounted in such casing and adapted to be operated to hold said casing stationary, an independent lever having a dog, said lever being operable to move said dog in one of said recesses, a lever for operating said friction band, and means for operating said first named lever with the movement of said last named lever to throw said dog into one of said recesses when said friction band is engaged with said casing, as described.

2. A device of the character described comprising the combination with a driving shaft and a driven shaft, of a casing provided with recesses, a clutch member movable on one of said shafts and operable to engage said casing to lock said casing stationary with respect to said shaft, a lever adapted to operate said clutch member, another lever provided with a dog operable to engage one of said recesses, a link connecting said levers whereby when said clutch member is engaged with said casing, said dog will be disengaged from said recesses, a train of gears disposed within said casing and being connected with each of said shafts, a friction band adapted to engage said casing, means for operating said friction band, and means whereby when said friction band is engaged with said casing said dog will engage one of said recesses, as described.

3. A device of the character described comprising the combination with a driving shaft and a driven shaft of a casing, a train of gears carried thereby connected with each of said shafts, a friction band for holding said casing stationary independently of said shafts, a lever for operating said friction band, an independent lever having means for engaging said casing to hold it rigid against any movement within said friction band, operating means for said second named lever comprising a third lever and a link connection between said third lever and said second named lever, said first named lever being operable to engage said third named lever to move said second named lever with the movement of said first named lever, as described.

4. A device of the character described comprising the combination with a driving shaft and a driven shaft, of a casing, a train of gears disposed within said casing and connected with each of said shafts, a clutch member operable on one of said shafts to engage said casing to hold said casing stationary with respect to said shaft, a lever for operating said clutch member, a friction band operable to hold said casing stationary independently of said shafts, a lever for operating said friction band, an independent means for holding said casing rigid against any movement within said friction band, a third lever for operating said last named means, said third named lever lying adjacent said first named lever whereby said third named lever cannot be operated until said first named lever is moved out of the path thereof, said second named lever being operable to engage and move said third named lever when said first named lever is moved out of the path thereof, as described.

In testimony whereof I affix my signature in presence of two witnesses.

ALFRED N. ADAMS.

Witnesses:
CLARENCE M. SMITH,
JOSHUA B. WEBSTER.

Copies of this patent may be obtained for five cents each, by addressing the "Commissioner of Patents, Washington, D. C."